United States Patent Office 2,857,108
Patented Oct. 21, 1958

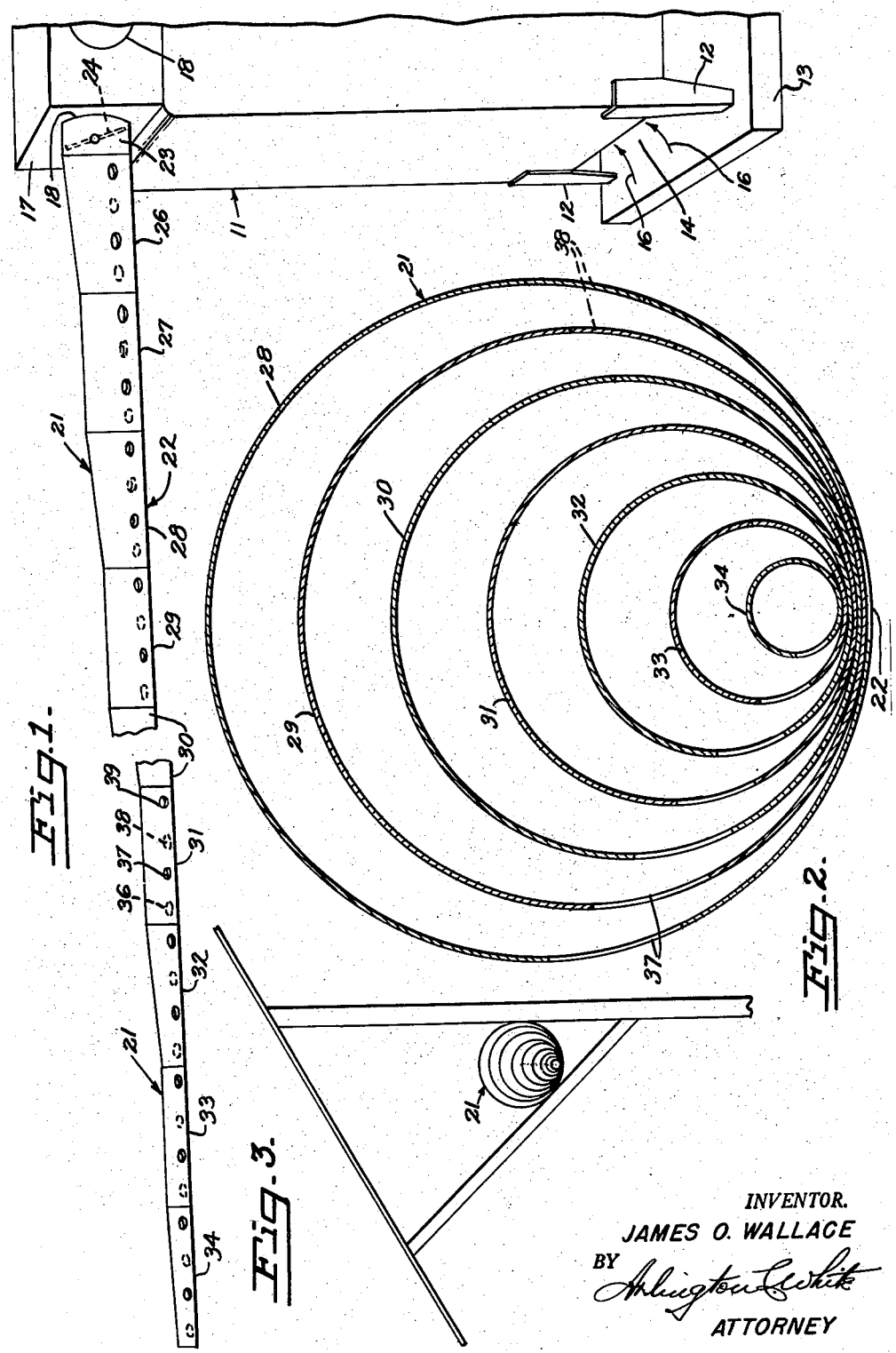

2,857,108

GREENHOUSE HEATING SYSTEM

James O. Wallace, South San Francisco, Calif.

Application October 18, 1954, Serial No. 462,779

1 Claim. (Cl. 237—53)

The invention, in general, relates to the heating and air conditioning art and more particularly relates to a system for maintaining a uniform hot or warm temperature throughout the entire interior of greenhouses despite colder temperatures outside of the greenhouse.

Heretofore there have been attempts to provide equipment capable of maintaining desired temperature conditions within a greenhouse; such equipment usually comprising an underground main duct for conveying heated air to and through a series of duct-communicating risers located at random positions within the greenhouse for emitting the heated air above the tops of plants. These prior systems have been found disadvantageous because of the rapid dissipation of the transmitted air at isolated spots or areas, which results from the diminishing pressures behind the heated air throughout the main duct and the risers of the system. Uniformity of temperature throughout the greenhouse, therefore, is not attained by such prior equipment. The present invention is directed to obviating inherent disadvantages of prior greenhouse heating systems and the provision of relatively simple elements for effecting proper greenhouse heating.

The primary object of the present invention is to provide an improved greenhouse heating system wherein heated air under effective pressures is uniformly distributed over the entire interior of a greenhouse.

Another object of my invention is to provide an improved greenhouse heating system of the indicated nature which is additionally characterized by the incorporation therein of a main sectional duct for distributing heated air under uniform pressure at effective angular directions to the plants in the greenhouse.

A still further object of my present invention is to provide an improved greenhouse heating system of the aforementioned character wherein the main sectional duct is tapered, section to section, permitting ready shipping and storage thereof in nested condition.

Another object of the invention is to provide an improved greenhouse heating system which is installable at low cost and which can be maintained at a minimum of expense.

Other objects of the invention, together with some of the advantageous features thereof, will appear from the following description of a preferred embodiment of my invention which is illustrated in the accompanying drawings. It is to be understood, however, that I am not to be limited to the precise embodiment shown, nor to the precise arrangement of the various parts thereof, as my invention, as defined in the appended claims, can be embodied in a plurality and variety of forms.

Referring to the drawings:

Fig. 1 is a fragmentary elevational view of a preferred embodiment of the present invention, the sectional duct being broken for purposes of illustration; this view illustrating the system installed in but one-half of the length of a standard greenhouse.

Fig. 2 is a sectional view taken through a nested group of tube sections of the preferred embodiment of the invention.

Fig. 3 is a fragmentary elevational view illustrating the supporting means for the duct sections of the preferred embodiment of the invention.

In its preferred form, the improved greenhouse heating system of my present invention preferably comprise a furnace disposed in the approximate center of a greenhouse for producing a flow of heated fluid under predetermined pressure, and means in communication with the outlet of said furnace for distributing the produced heated fluid under substantially said predetermined pressure over the plants and other growth throughout the greenhouse.

As particularly illustrated in Fig. 1 of the annexed drawings, I provide a furnace 11 which is set up at approximately the center of a standard greenhouse which usually has the dimensions of approximately 100 feet in length and 30 feet in width. The furnace 11, in the preferred embodiment of the invention, is supported on legs 12 resting upon a concrete foundation 13, thus providing a space 14 between the foundation and the open bottom, not shown, of the furnace so that a draft of cold air will be continuously drawn into the furnace, as indicated by the small arrows 16, when the furnace is in operation. Any suitable fuel, not noxious or detrimental in any way to plant growth, flowers and the like, may be utilized for firing the furnace 11, such as natural gas or butane. The furnace is provided on its top with a head 17, or plenum, which is in communication with the outlet, not shown, of the furnace; the plenum being hollow and being provided with a plurality of outlets 18 in the sides thereof. Firing of the furnace 11 will cause the production of a flow of heated fluid under a predetermined pressure at its outlet which moves into the head 17 thereof for distribution.

In accordance with my present invention, I provide means for distributing the heated fluid produced by the furnace 11 throughout the length and width of the greenhouse, not shown, in which the furnace is disposed and under substantially predetermined pressure at which the fluid flow is emitted from the furnace. These means preferably comprise a plurality of ducts which are similar in character and of which but one is shown in the annexed drawings for brevity of description and simplicity of illustration, such duct being generally designated by the reference numeral 21. Duct 21 is supported at an elevation from the floor or ground surface of the greenhouse, and this support usually is provided by the crotches between the standards and braces, see Fig. 3, supporting the roof and side-walls of the greenhouse. By so supporting the duct 21, the bottom 22 of the duct will lie horizontally or parallel to the floor or ground surface of the greenhouse and the inlet end 23 of the duct 21 is placed in communication with one side outlet 18 of the plenum 17 whereby duct 21 extends longitudinally and for approximately one-half of the length of the greenhouse. It is to be understood that another duct, not shown but similar in all respects to duct 21 and similarly supported, is placed in communication with another outlet 18, not shown, of the plenum 17 diametrically opposite to the placement of duct 21; this latter mentioned duct extending in the opposite direction longitudinally of and for approximately the remaining one-half of the length of the greenhouse. Thus, for a greenhouse of 100 feet length and 30 feet width, the furnace 11 is located at the approximate center of the greenhouse and two ducts 21 of approximately 42 feet in length each, extend from plenum 17 of the furnace in opposite directions longitudinally of the greenhouse. It is to be understood, of course, that larger greenhouses require larger installations. For example, in a greenhouse of double the capacity, say 200 feet in length and 60 feet in width, two furnaces 11 are disposed in the greenhouse at the 50 feet and 150 feet points measured from a given end of the greenhouse, and four ducts similar to illustrated duct 21 are utilized; two for each furnace and in the arrangement described above. Moreover, transversely extending ducts of similar type but of shorter length are placed in communication with the plenums of the furnaces for distributing the heated fluid over the widths of such wider greenhouses.

As illustrated in Figs. 1 and 2, the duct 21 is detachably secured by any suitable means such as metal screws, not shown, to a short cylindrical section 23 communicating with side outlet 18 of the plenum 17 and in which section 23 a suitable damper means 24, such as a quadrant damper, is installed for regulating fluid flow. The duct 21 comprises a plurality of sections of which but nine are shown in the accompanying drawings designated by the reference numerals 26 to 34 inclusive; such duct sections alternately constituting irregular and regular cylindrical tubes in that the irregular sections 26, 28, 30, 32 and 34, commencing with section 26 connected to short cylindrical section 23 adjacent to plenum 17, all are tapered on their tops and are straight on their bottoms while the intermediate regular cylindrical sections 27, 29, 31 and 33 are true cylindrical tubes. Moreover, the duct 21 is of diminishing cross-section from the plenum 17 outwardly to the terminus of the duct and each of the sections 26 to 34 inclusive is formed with a plurality of port openings 36, 37, 38 and 39 therein which are in opposite sides thereof, arranged in staggered relationship side to side, as indicated by the full and dotted line showings of Fig. 1 of the drawings, and which are all below the transverse diameters of the sections as clearly shown in Fig. 2. It is to be noted that the port openings 36 to 39 inclusive of the duct sections of duct 21 preferably are circular and preferably all of the same diameters for all of the duct sections regardless of the diminution in cross-section of the duct sections outwardly from the furnace 11. That is to say, the port openings 36 to 39 inclusive of duct section 26 are circular and of the same diameter, say 3 inches and the diameters of the port openings 36 to 39 inclusive of the remaining duct sections all are of the same diameters, i. e., 3 inches.

By such duct construction, with the sections of diminishing cross-section outwardly from the furnace 11, the produced heated fluid from the furnace 11 will be conveyed throughout the entire length of the duct 21 for emanation not only through the end of the last section 34 of the duct but also from all of the port openings 36 to 39 inclusive of each duct section under substantially the same pressure as delivered by the furnace 11. Moreover since the port openings 36 to 39 inclusive of all of the duct sections are all below the transverse diameters of the sections, the heated fluid will be downwardly directed from both sides of the duct all along the length thereof and, therefore, effective heat treatment of greenhouse plant growth is attained. The same construction of duct sections obtains for the oppositely directed duct above mentioned in connection with a standard greenhouse of 100 feet length and 30 feet width, as well as to all ducts employed in larger greenhouses. Accordingly, cold air drawn through the bottom of the furnace 11 is heated by the furnace and caused to be delivered under pressure out through furnace plenum 17 and to the duct 21 from which it is downwardly directed from all port openings 36 to 39 inclusive of all duct sections under substantially the same pressure as delivered from the furnace onto the plant growth and throughout the entire greenhouse area.

Since the duct sections of duct 21, as well as of corresponding ducts communicating with furnace 11, are of diminishing cross-sections outwardly from the furnace, it is clear that the sections can be telescopically fitted together to provide each complete duct; the adjacent sections being detachably fastened together by means of mental screws. Because of this construction of the duct 21, the sections are readily nested together for easy transportation or storage when not in use in a greenhouse, taking up but a minimum of space in transit or in storage.

It is to be understood that the appended claims are to be accorded a range of equivalents commensurate in scope with the advance made over the prior art.

I claim:

A greenhouse heating system for maintaining a uniform warm temperature throughout the entire interior of a greenhouse despite colder temperatures outside of the greenhouse, said greenhouse heating system including a furnace for producing a flow of heated fluid under pressure, a horizontally disposed elongated linear duct having one end connected with the outlet of the furnace for transmitting the produced heated fluid under pressure, said duct comprising a plurality of short tubular sections connected end to end and all of said tubular sections having a common lowermost line of tangency, each of said tubular sections having a plurality of port openings of uniform diameter in opposite sides thereof, all located adjacent to the line of tangency for emitting and downwardly directing, toward the plants in the grenhouse, the heated fluid under uniform pressure from opposite sides of all sections, the upper portions of said tubular sections being closed against escape of heated fluid so that all heated fluid discharged from said tubular sections must be discharged downwardly by way of said port openings, said tubular sections being progressively smaller from the furnace end to the remote end, alternate tubular sections being frusto-conical in form, the remaining tubular sections being right-cylindrical in form.

References Cited in the file of this patent

UNITED STATES PATENTS

| | | |
|---|---|---|
| 815,093 | Kenney | Mar. 13, 1906 |
| 1,222,794 | Quinn | Apr. 17, 1917 |
| 2,089,653 | Kiss | Aug. 10, 1937 |
| 2,201,312 | Hauser | May 21, 1940 |
| 2,445,920 | Olson | July 27, 1948 |